(12) United States Patent
Chen et al.

(10) Patent No.: US 12,113,465 B2
(45) Date of Patent: Oct. 8, 2024

(54) MOTOR DRIVE SYSTEM

(71) Applicant: ADATA TECHNOLOGY CO., LTD., New Taipei (TW)

(72) Inventors: Yu-Liang Chen, Chiayi (TW); Chi-Chien Lin, Keelung (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 16 days.

(21) Appl. No.: 18/038,710

(22) PCT Filed: Nov. 27, 2020

(86) PCT No.: PCT/CN2020/132293
§ 371 (c)(1),
(2) Date: May 25, 2023

(87) PCT Pub. No.: WO2022/110026
PCT Pub. Date: Jun. 2, 2022

(65) Prior Publication Data
US 2024/0030854 A1    Jan. 25, 2024

(51) Int. Cl.
*H02P 27/06*    (2006.01)
*H02J 7/00*    (2006.01)
*H02J 7/34*    (2006.01)
*H02P 3/18*    (2006.01)
*H02P 23/14*    (2006.01)

(52) U.S. Cl.
CPC ............ *H02P 27/06* (2013.01); *H02J 7/0063* (2013.01); *H02J 7/342* (2020.01); *H02J 7/345* (2013.01); *H02P 3/18* (2013.01); *H02P 23/14* (2013.01); *H02J 2207/50* (2020.01)

(58) Field of Classification Search
CPC .. H02P 27/06; H02P 3/18; H02P 23/14; H02J 7/0063; H02J 7/342; H02J 7/345; H02J 2207/50; H02M 1/322; H02M 1/36; H02M 7/53873
See application file for complete search history.

(56) References Cited

U.S. PATENT DOCUMENTS

| | | | |
|---|---|---|---|
| 2018/0105059 A1* | 4/2018 | Namou | G01R 31/3271 |
| 2018/0254731 A1* | 9/2018 | Ishita | H02M 1/36 |
| 2020/0298722 A1* | 9/2020 | Smolenaers | H02J 7/345 |

* cited by examiner

*Primary Examiner* — Daniel Cavallari
(74) *Attorney, Agent, or Firm* — Li & Cai Intellectual Property (USA) Office

(57) ABSTRACT

A motor drive system includes a precharge circuit having an intelligent charging and discharging mechanism. In terms of charging, a delay circuit can be used to delay a timing for turning on the low-impedance path, a detection circuit can also detect a system status and a battery voltage, and perform a discharge process in a non-driving mode and when the battery voltage continues to decrease. In the discharge process, a variety of applications can be realized using driving mechanism of the motor drive system.

10 Claims, 6 Drawing Sheets

MOTOR DRIVE SYSTEM

CROSS-REFERENCE TO RELATED PATENT APPLICATION

This is the U.S. national phase application of International Application PCT/CN2020/132293, filed Nov. 27, 2020, which international application was published on Jun. 2, 2022, as International Publication No. WO 2022/110026. The international application claims priority to Taiwan Patent Application No. 109141702, filed on Nov. 27, 2020, the contents of which are incorporated herein by reference in their entireties.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor drive system, and more particularly to a motor drive system having a precharge circuit with an intelligent charging and discharging mechanism.

BACKGROUND OF THE DISCLOSURE

In the existing motor electric driving system, in order to avoid large instantaneous currents causing system damage and shortening service life during a powered on process, a precharge circuit is usually set between a power source (for example, a battery) and a controller, such that switches in a main circuit can be turned on after an internal capacitor is fully charged by a small current to avoid damage.

In general, even if the precharge circuit works normally during the power-on process, issues can often occur during the power-off process. For example, the current consumed by the system can be very low when the controller of the system does not drive the motor as the system is about to be shut down, so that it takes an extremely long time (10 seconds to minutes) to discharge the internal capacitor to a voltage below a safe voltage. During the discharge process, if the power source is restarted in real time, or if the unpowered battery cells are started in stages, a momentary high current will be generated since the capacitor voltage has not yet reached a threshold voltage for starting precharging, causing system damage or system failure.

SUMMARY OF THE DISCLOSURE

In response to the above-referenced technical inadequacies, the present disclosure provides a motor drive system having a precharge circuit with an intelligent charging and discharging mechanism.

In one aspect, the present disclosure provides a motor drive system for driving a motor, the motor drive system includes a battery pack, a power control circuit, a capacitor, an inverter circuit, a motor control circuit, a state detection circuit, a precharge circuit, a delay circuit and a discharge control circuit. The battery pack includes a first battery unit and a second battery unit connected in series between a first input terminal and a second input terminal. The power control circuit is configured to control the battery pack to be turned on and off. The capacitor is connected between the first input terminal and the second input terminal. The inverter circuit is connected to the first input terminal and the second input terminal to be powered by the battery pack, the inverter circuit has a plurality of switch elements that are connected to form a plurality of output terminals, and the plurality of output terminals are connected to a plurality of phase windings of the motor, respectively. The motor control circuit is configured to generate a set of motor control signals, so as to control the plurality of switch elements to be turned on and off, such that each of the phase windings of the motor is energized to drive the motor. The state detection circuit is configured to detect an operating state of the motor drive system. The precharge circuit includes a low-impedance path, a high-impedance path, a precharge switch and a detection circuit. The high-impedance path is connected between the second input terminal and the battery pack. The low-impedance path is connected between the second input terminal and the battery pack, and a resistance of the high-impedance path is greater than a resistance of the low-impedance path. The precharge switch is disposed on the low-impedance path. The detection circuit is configured to: compare a first voltage at the first input terminal with a precharge start-up voltage to correspondingly generate a detection result signal. In response to the first voltage being higher than the precharge start-up voltage, the detection result signal is used to control the precharge switch to be turned on, and in response to the first voltage being less than or equal to the precharge start-up voltage, the detection result signal is used to control the precharge switch to be turned off. The detection circuit is further configured to detect whether or not the operating state is a non-driving mode and whether or not the first voltage decreases with time. In response to detecting that the operating state is the non-driving mode and the first voltage decreases with time, the detection circuit outputs a discharge indication signal for performing a discharge process on the capacitor, and stop outputting the discharge indication signal in response to detecting that the first voltage no longer decreases with time. The delay circuit disposed between the detection circuit and the precharge switch, and is configured to delay the detection result signal for a predetermined delay time. The discharge control circuit is configured to execute the discharge process according to the discharge indication signal, and the discharge process includes: obtaining a current operating angle of the motor through the motor control circuit; and correcting, according to the current operation angle, the set of the motor control signals by a correction angle, so as to stop the motor and enter a discharge mode.

Preferably, the power control circuit is further configured to generate a power state signal according to on and off states of the battery pack, and the detection circuit is further configured to: in response to detecting that the operating state is the non-driving mode, determine whether the battery pack is turned on or off according to the power state signal; and in response to determining that the battery pack is turned off, output the discharge indication signal.

Preferably, the detection circuit is further configured to: in response to detecting that the battery pack is turned on, determine whether or not the first voltage decreases over time.

Preferably, when the detection circuit is configured to determine whether or not the first voltage decreases with time, the detection circuit is further configured to determine whether or not a decrease rate of the first voltage is greater than a first predetermined decrease rate, and if so, the first voltage is determined to decrease with time.

Preferably, when the detection circuit is configured to determine that the first voltage does not decrease with time, the detection circuit is further configured to determine whether or not a motor lock command input from a user is received, and in response to receiving the motor lock command, the detection circuit is configured to output the discharge indication signal.

Preferably, when the detection circuit is configured to detect whether or not the first voltage decreases with time, the detection circuit is further configured to determine whether or not a decrease rate of the first voltage is less than a second predetermined decrease rate, and if so, the first voltage is determined to no longer decrease with time.

Preferably, the motor control circuit is further configured to detect a plurality of phase currents of a plurality of the phase windings of the motor, so as to generate angle information for indicating the current operating angle of the motor.

Preferably, in response to detecting that the operating state is not the non-drive mode, the detection circuit is further configured to detect whether an electronic brake command input from a user is received, and if so, the detection circuit outputs the discharge indication signal.

Preferably, when the discharge indication signal is output in response to receiving the electronic brake command input from a user, the detection circuit is further configured to detect whether or not the first voltage decreases with time, and in response to detecting that the first voltage no longer decreases with time, the detection circuit stops outputting the discharge indication signal.

Preferably, when the precharge switch is turned off, the battery pack charges the capacitor with a precharge current through the high-impedance path, and the predetermined delay time is at least longer than a charging time associated with the precharge current and a capacitance of the capacitor.

In conclusion, the motor drive system provided by the present disclosure has a precharge circuit with an intelligent charging and discharging mechanism. In terms of charging, a delay circuit can be used to delay a timing for turning on the low-impedance path, such that the charged internal capacitor can prevent the system from being damaged due to the large instantaneous current generated when the system is restarted quickly.

On the other hand, the detection circuit of the precharge circuit can detect a system status and a battery voltage, and perform a discharge process in a non-driving mode and when the battery voltage continues to decrease, such that the voltage can be lower than the rated safe voltage and the precharge start-up voltage. In the discharge process, a variety of applications can be further realized using the driving mechanism of the motor drive system.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

Figure 1:
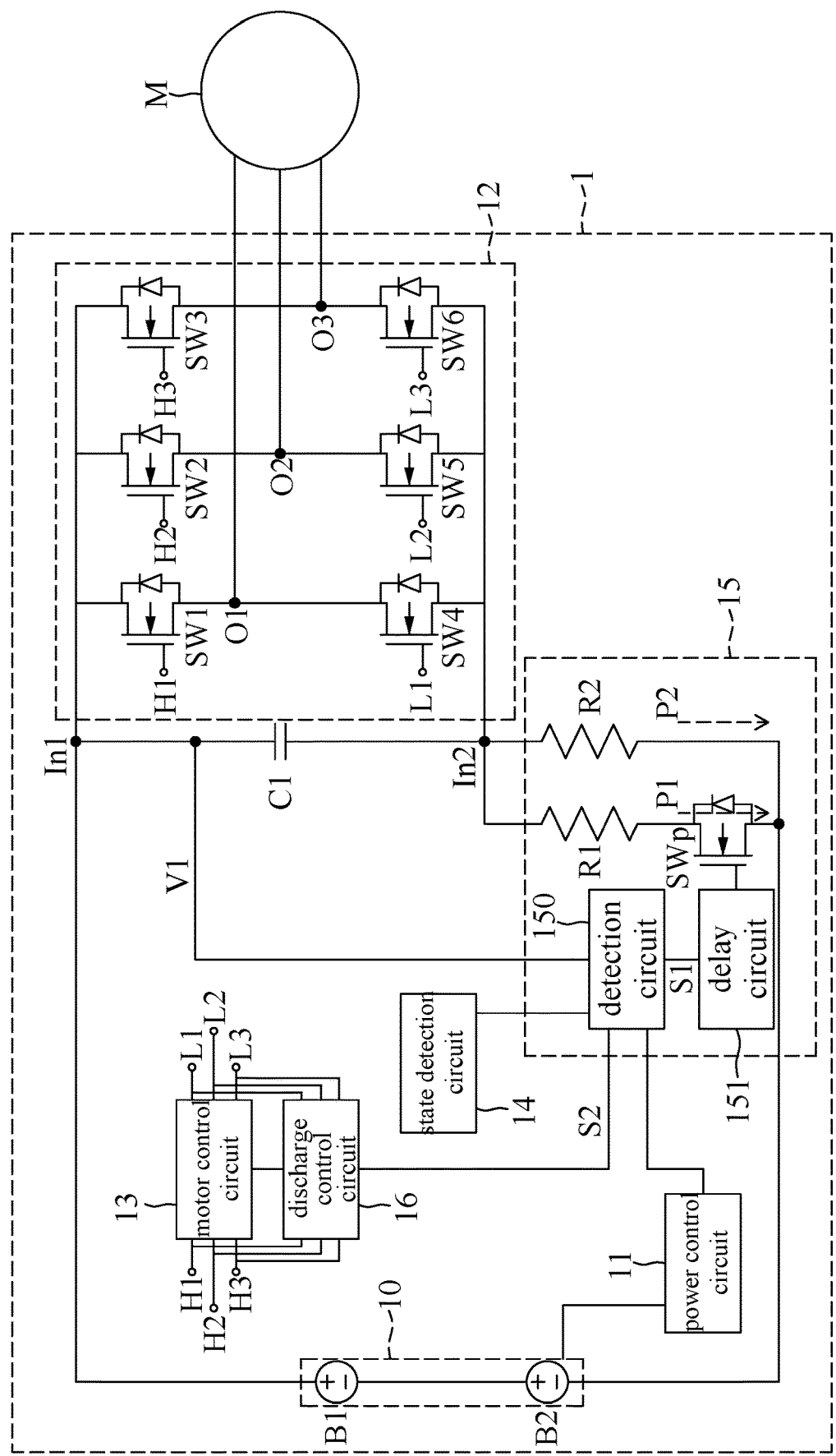
FIG. 1 is a functional block diagram of a motor drive system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Reference is made to FIG. 1, one embodiment of the present disclosure provides a motor drive system 1 for driving a motor M, the motor drive system 1 includes a battery pack 10, a power control circuit 11, a capacitor C1, an inverter circuit 12, a motor control circuit 13, a state detection circuit 14, a precharge circuit 15 and a discharge control circuit 16.

The battery pack 10 can essentially include a first battery unit B1 and a second battery unit B2 connected in series between a first input terminal In1 and a second input terminal In2, but the present disclosure is not limited thereto, and the battery pack 10 can include two or more battery units. The first battery unit B1 and the second battery unit B2 can be, for example, lithium-ion batteries, lithium-ion polymer batteries, lead-acid batteries (full tank lead-acid batteries, deep-cycle lead-acid batteries, and valve-regulated lead-acid batteries), nickel-cadmium batteries, Ni-MH batteries, zinc-air batteries, sodium nickel chloride batteries (zebra), and the like, each can include a built-in overcurrent protection circuit.

The power control circuit 11 can be configured to control the battery pack 10 to be turned on and off. For example, the power control circuit 11 can be a power management circuit including a power converter, but the present disclosure is not limited thereto. The capacitor C1 is connected between the first input terminal In1 and the second input terminal In2 The inverter circuit 12 is connected to the first input terminal In1 and the second input terminal In2 to be powered by the battery pack 10. The inverter circuit 12 has a plurality of switching elements that are connected to form a plurality of output terminals, for example, as shown in FIG. 1, the inverter circuit 12 includes switch elements SW1 to SW6 that form output terminals O1, O2 and O3, respectively. The output terminals O1, O2, O3 are respectively connected to a plurality of phase windings of the motor M. Taking a three-phase motor as an example, the output terminals O1, O2, O3 can be respectively connected to a U-phase winding, a V-phase winding and a W-phase winding of the motor M.

Figure 2:
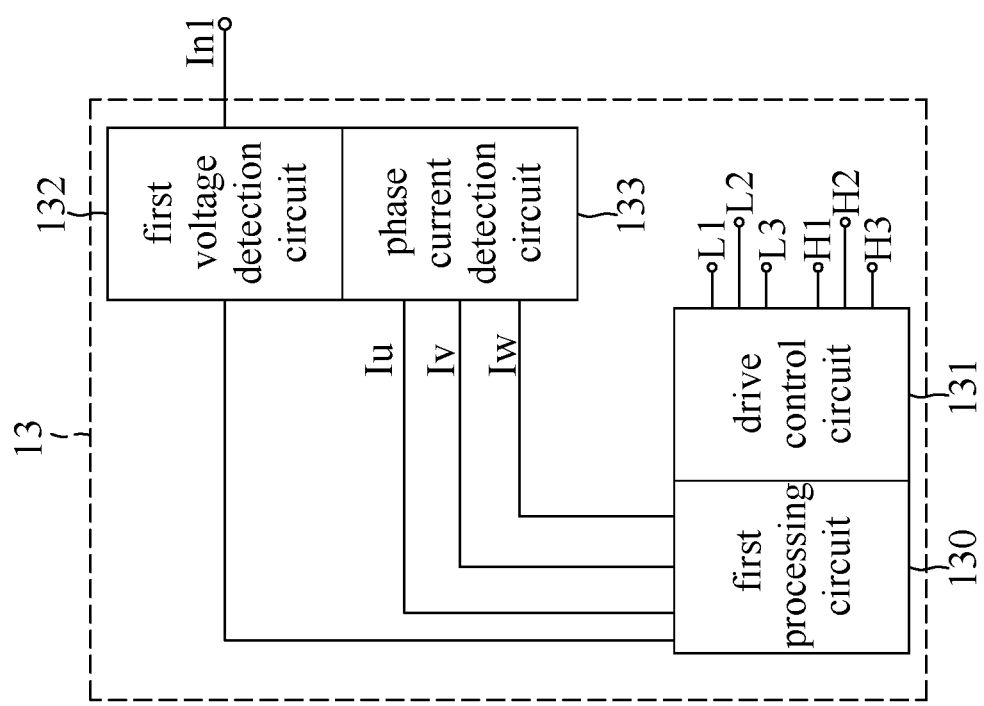
FIG. 2 is a functional block diagram of a motor control circuit according to one embodiment of the present disclosure.

The motor control circuit 13 can be configured to generate a set of motor control signals to control the above-mentioned switch elements to be turned on and off, such that each of the phase windings of the motor M can be energized to drive the motor M. The set of motor control signals can include motor control signals H1, H2, H3, L1, L2 and L3. Reference can be further made to FIG. 2, which is a functional block diagram of a motor control circuit according to one embodiment of the present disclosure. As shown in FIG. 2, the motor control circuit 13 can include a first processing circuit 130, a drive control circuit 131, a first voltage detection circuit 132 and a phase current detection circuit 133.

The first processing circuit 130 can be, for example, a microprocessor or a digital signal processor, and the first processing circuit 130 can be configured to execute a motor control algorithm to obtain independent torque currents and field currents from instantaneous phase currents Iu, Iv and Iw. A simple AC motor control can be implemented using a microprocessor-based control system, while an advanced AC variable-frequency drive can be implemented using a digital signal processor (DSP). The phase current detection circuit 133 can be configured to detect the phase currents Iu, Iv, and Iw of the U-phase winding, V-phase winding, and W-phase winding of the motor M, respectively, so as to generate an angle information for indicating a current operating angle of the motor M. The first voltage detection circuit 132 can configured to detect a first voltage V1 at the first input terminal In1.

The state detection circuit 14 is configured to detect an operating state of the motor drive system 1. The state detection circuit 14 can be, for example, a controller area network (CAN), which is used to exchange information among various electronic control devices in mobile vehicles such as automobiles or locomotives, so as to form an electronic control network.

The precharge circuit 15 can include a low-impedance path P1, a high-impedance path P2, a precharge switch SWp, a detection circuit 150 and a delay circuit 151. The low-impedance path P1 and the high-impedance path P2 are respectively connected between the second input terminal In2 and the battery pack 10, a resistance of the high-impedance path P2 is greater than a resistance of the low-impedance path P1, and the precharge switch SWp is set on the low-impedance path P1.

For example, the low-impedance path P1 includes a resistor R1 and the precharge switch SWp, and the high-impedance path P2 includes a resistor R2. In this case, a resistance of the resistor R2 is higher than a resistance of the resistor R1. Therefore, the high-impedance path P2 can be used to prevent instantaneous short-circuiting caused by directly conducting the battery pack 10 with capacitor C1 since there is no charge or only a very low residual voltage on the capacitor C1 when the motor drive system 1 is powered on.

In one embodiment of the present disclosure, the detection circuit 150 needs to play two roles, namely, determining whether or not a battery voltage reaches a precharge start-up voltage, and determining whether or not to trigger a discharging mechanism according to a system status and the battery voltage.

In terms of precharging, the detection circuit 150 can be configured to compare the first voltage V1 at the first input terminal In1 with the precharge start-up voltage, and correspondingly generate a detection result signal S1. In response to the first voltage V1 being higher than the precharge start-up voltage, the detection result signal S1 is used to control the precharge switch SWp to be turned on. In response to the first voltage V1 being less than or equal to the precharge start-up voltage, the detection result signal S1 is used to control the precharge switch SWp to be turned off.

On the other hand, the detection circuit 150 is also configured to detect whether or not an operating state of the motor drive system 1 is a non-driving mode, and whether or not the first voltage V1 decreases with time. In response to detecting that the operating state is the non-driving mode and the first voltage V1 decreases with time, the detection circuit 150 outputs a discharge indication signal S2 for performing a discharge process on the capacitor C1, and stops outputting the discharge indication signal S2 in response to detecting that the first voltage V1 no longer decreases with time.

The delay circuit 151 is disposed between the detection circuit 150 and the precharge switch SWp, and is configured to delay the detection result signal S1 for a predetermined delay time T1. The delay circuit 151 can be, for example, an RC circuit, and since the detection result signal S1 can be used to turn on the pre-charge switch SWp when the first voltage V1 is higher than the precharge start-up voltage, the delay circuit 151 can delay timing for turning on the low-impedance path P1 to gain time for charging the capacitor C1, and thus the charged capacitor C1 can prevent the system from being damaged due to the instantaneous large current generated when the system restarts quickly.

It should be noted that the battery pack 10 will charge the capacitor C1 with a pre-charging current Ipc through the high-impedance path P2 when the precharge switch SWp is turned off, and the above-mentioned predetermined delay time T1 needs to be at least greater than a charging time T2 associated with the precharge current Ipc and the capacitance of the capacitor C1. The delay time T1 needs to satisfy: $T1 > T2 = C1 \cdot Vbat/Ipc$, where Vbat is a voltage provided by the battery pack 10. Therefore, parameters of each component in the precharge circuit 15 can be designed according to the conditional expression.

Figure 3:
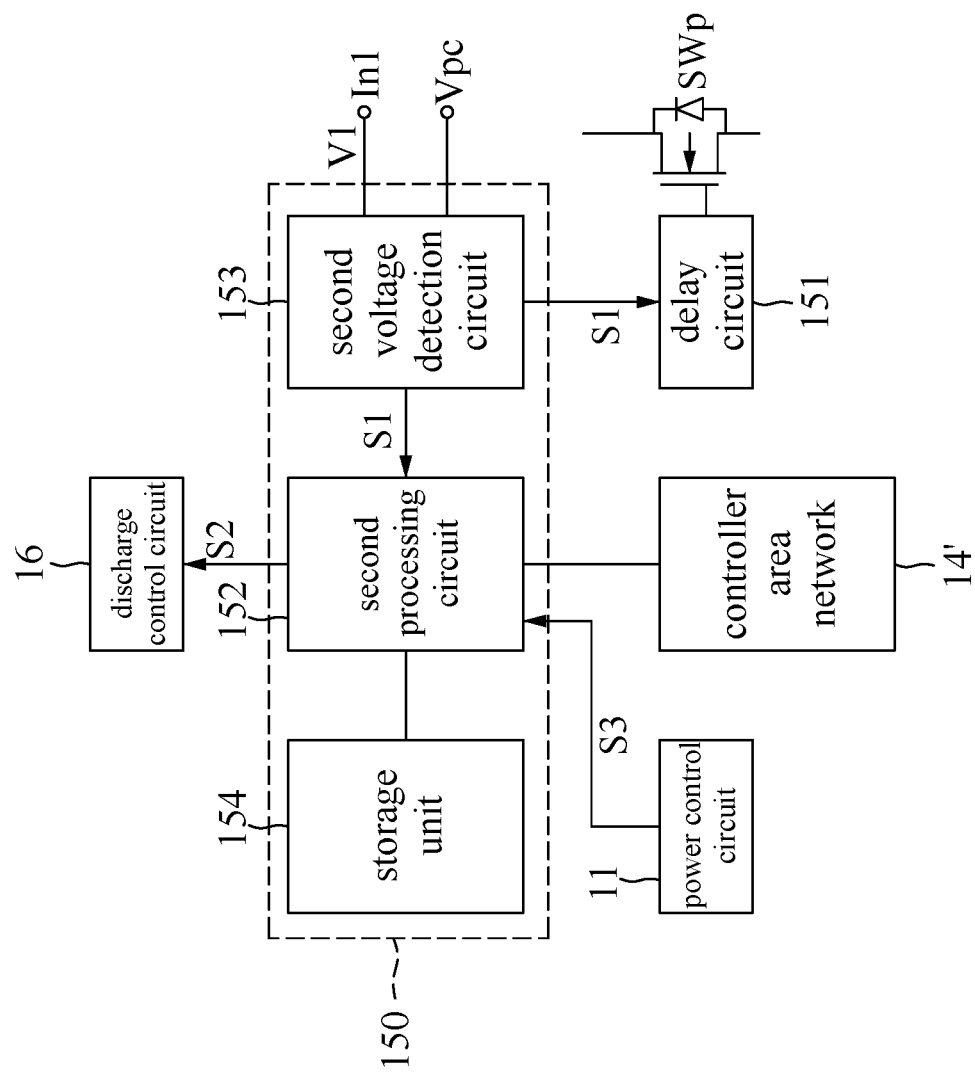
FIG. 3 is a detailed functional block diagram and a peripheral circuit block diagram of the detection circuit according to one embodiment of the present disclosure.

Reference can be further made to FIG. 3, which is a detailed functional block diagram and a peripheral circuit block diagram of the detection circuit according to one embodiment of the present disclosure. As shown in FIG. 3, the detection circuit 150 can further include a second processing circuit 152, a second voltage detection circuit 153, and a storage unit 154.

In this case, the second processing circuit 152 can be, for example, a microprocessor or a digital signal processor, and the second voltage detection circuit 153 can be configured to obtain the first voltage V1 at the first input terminal In1 and the precharge start-up voltage Vpc (for example, by receiving a reference voltage), and to compare the first voltage V1 with the precharge start-up voltage Vpc and correspondingly output a detection result signal S1.

On the other hand, the power control circuit 11 is further configured to generate a power state signal S3 according to ON and OFF states of the battery pack 10. In response to detecting that the operating state is the non-driving mode, for example, the second processing circuit 152 of the detection circuit 150 is further configured to determine whether or not the battery pack is turned on or off according to the power state signal S3. In response to detecting that the battery pack 10 is turned off, the detection circuit 150 (or the second processing circuit 152 therein) outputs the discharge indication signal S2 to the discharge control circuit 16.

In the embodiment of FIG. 3, the controller area network 14' described above is used as the state detection circuit 14 for obtaining the operating state of the motor drive system 1 and notifying the second processing circuit 152. For example, the controller area network 14' can detect whether or not the operating state is a driving mode or a non-driving mode.

Moreover, the storage unit 154 can be, for example, an electronically erasable rewritable read-only memory (EEPROM), which stores program codes or firmware for implementing various functions of the detection circuit 150, and the program codes or firmware can be executed by the second processing circuit 152.

In the above-mentioned architecture, the detection circuit 150 can determine whether or not the battery pack 10 or a part of the battery units therein is off-line by detecting whether or not the operating state of the motor drive system 1 is the non-driving mode and whether or not the first voltage V1 decreases with time. The discharge process is performed for the capacitor C1 if it is detected that the battery pack 10 or a part of the battery units therein is off-line, such that the first voltage V1 is lower than the precharge start-up voltage Vpc. Alternatively, a discharge time can be further adjusted, such that the first voltage V1 can be lower than a rated safe voltage within a rated time.

Reference is further made to FIG. 1, in which the discharge control circuit 16 can be configured to execute the discharge process according to the discharge instruction signal S2. Specifically, this discharge process is applicable to the existing motor driving circuit, which uses the motor M as a load, and the windings of each phase of the motor M are driven in a driving manner similar to the general driving manner but with different phase angles when it is determined that the system is in the non-driving mode, such that a rotor of the motor M is stationary without shaking.

Specifically, the discharge control circuit 16 can obtain a current operating angle of the motor M through the motor control circuit 13 (for example, through the phase current detection circuit 133 and the first processing circuit 130), and then the set of motor control signals can be corrected according to the obtained current operating angle, so as to drive the motor M to stop and enter the discharge mode.

For example, for the three-phase motor, the current operating angle can be determined based on the detected phase currents Iu, Iv, and Iw by referring to a commonly used driving signal table of six-step square-wave. The discharge control circuit 16 can correct the set of motor control signals with +90 degrees or −90 degrees as a correction angle according to the current operating angle, so as to generate new motor control signals H1, H2, H3, L1, L2, L3 for driving the motor M. At this time, the rotor of the motor M can be kept stationary without shaking since an electromagnetic force of a stator of the motor M is parallel to a direction of a magnetic field of the rotor.

A criteria of determination performed by the detection circuit 150 is described as follows. In detail, the detection circuit 150 can substantially determine whether or not a decrease rate of the first voltage V1 is greater than a first predetermined rate of decrease when detecting whether or not the first voltage V1 decreases with time, and if so, the first voltage V1 is determined to decrease with time. For example, the first predetermined decrease rate can be −7 V/s, but the above-mentioned value is merely an example, and the present disclosure is not limited thereto. On the other hand, the detection circuit 150 can further determine whether or not the decrease rate of the first voltage V1 is less than a second predetermined decrease rate, and if so, the first voltage V1 is determined to no longer decrease with time. For example, the second predetermined decrease rate can be −3V/s, but the above-mentioned value is merely an example, and the present disclosure is not limited thereto.

Figure 4:
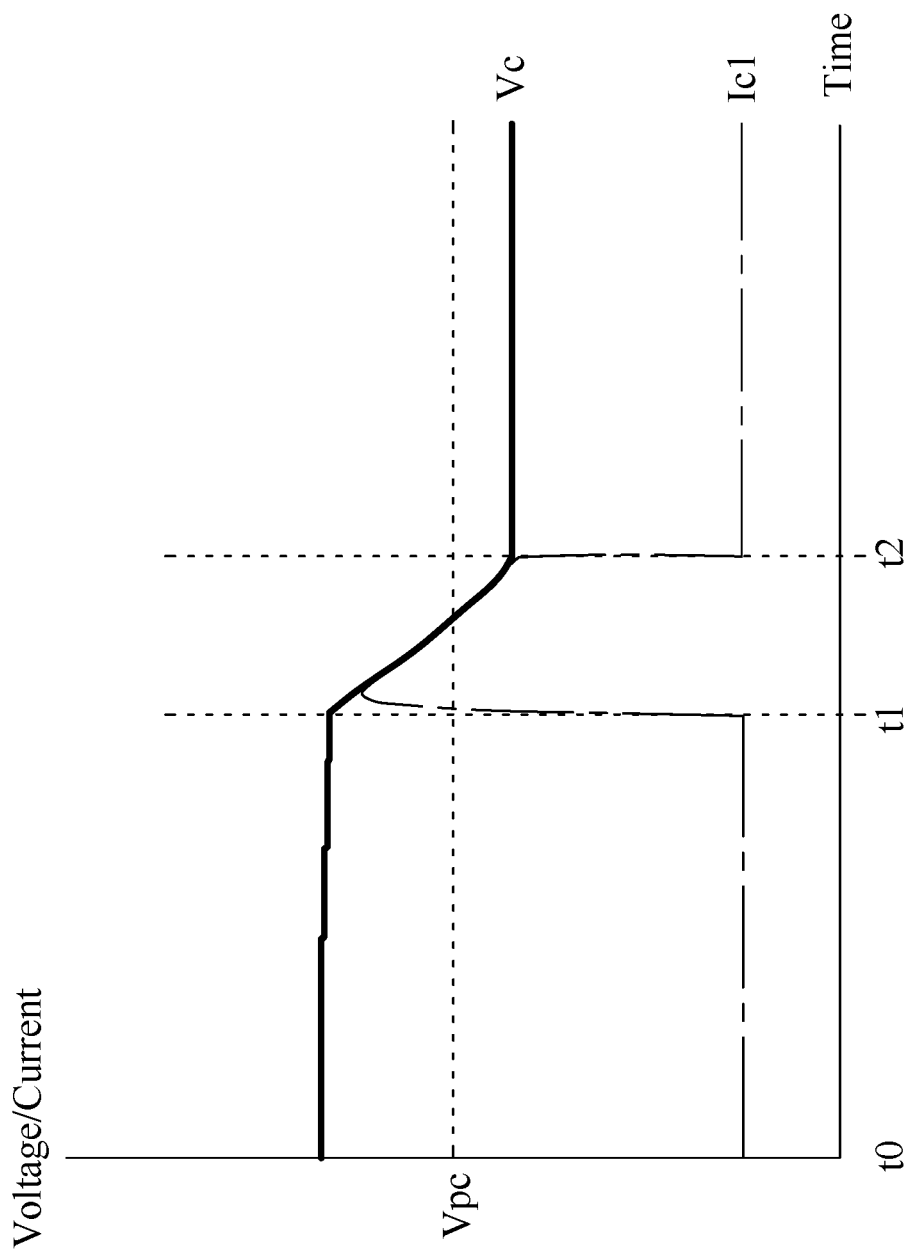
FIG. 4 is a plot of voltage and current versus time for a precharge circuit implementing an intelligent discharge mechanism according to one embodiment of the present disclosure.

Further reference can be made to FIG. 4, which is a plot of voltage and current versus time for a precharge circuit implementing an intelligent discharge mechanism according to one embodiment of the present disclosure. In FIG. 4, a capacitor voltage Vc (that is, the first voltage V1) and a capacitor discharge current Ic1 are shown. As shown in FIG. 4, between time t0 and t1, the capacitor voltage Vc continues to drop, and the detection circuit 150 detects that the operating state of the motor drive system 1 is the non-driving mode, and the capacitor voltage Vc drops with time. Therefore, the discharge mechanism is triggered at time t1, which makes the capacitor discharge current Ic1 rise and the capacitor voltage Vc drops rapidly; in other words, the precharge circuit 15 is forced to initialize.

Figure 5:
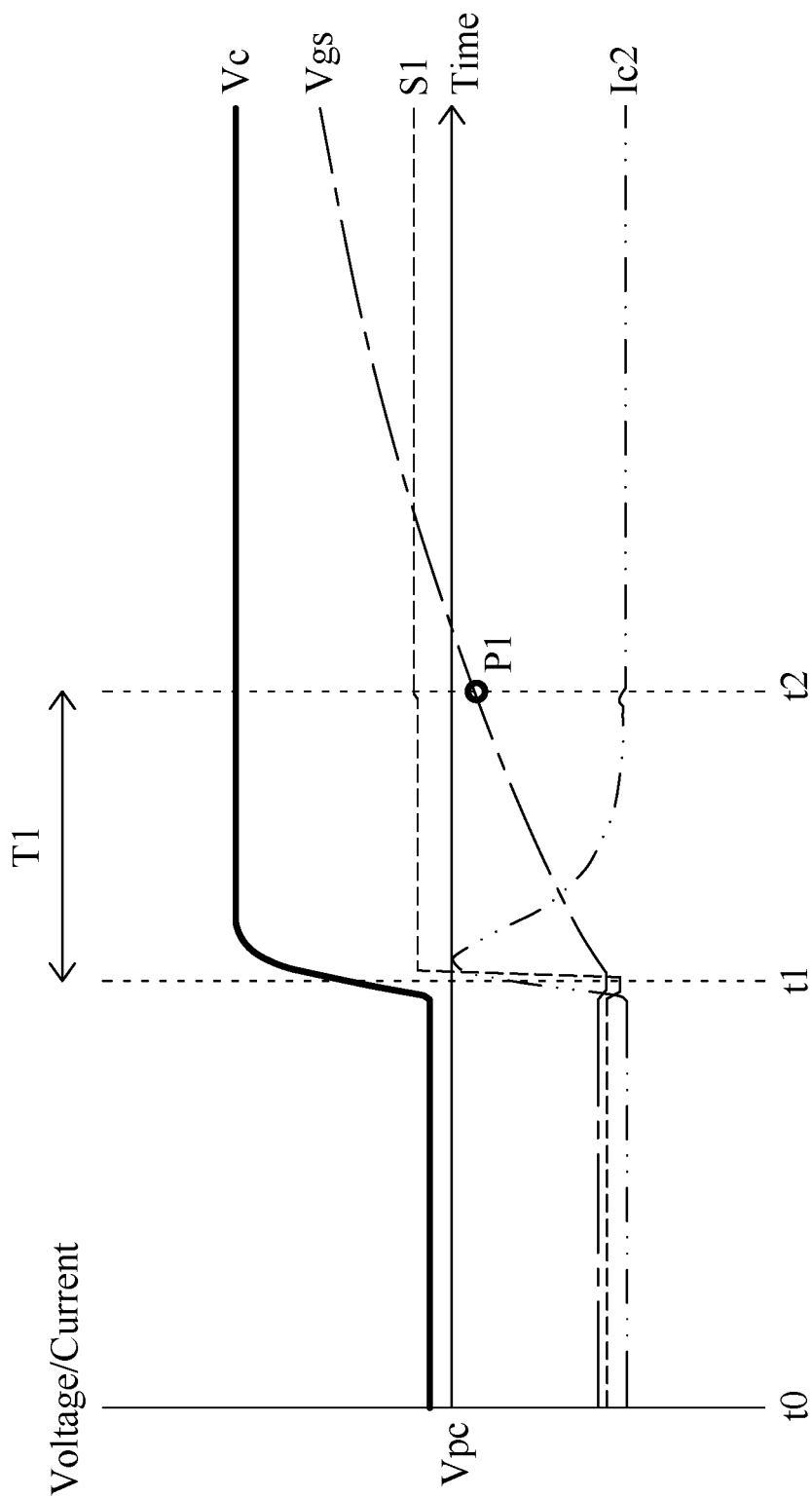
FIG. 5 is a plot of voltage and current versus time for the precharge circuit implementing a delayed turn-on mechanism according to one embodiment of the present disclosure.

Further reference can be made to FIG. 5, which is a plot of voltage and current versus time for the precharge circuit implementing a delayed turn-on mechanism according to one embodiment of the present disclosure. In FIG. 5, the capacitor voltage Vc (that is, the first voltage V1), the precharge switch signal Vgs, the detection result signal S1 and a capacitor charging current Ic2 are shown. As shown in FIG. 5, at time t0, only the first battery unit B1 of the battery pack 10 is turned on; however, the voltage provided by the first battery unit B1 is still higher than the precharge start-up voltage Vpc. At time t1, the second battery unit B2 is powered on. At this time, the detection result signal S1 can be used to control the precharge switch SWp to be turned on since the capacitor voltage Vc is higher than the precharging starting voltage Vpc. However, a timing of turning on the low-impedance path P1 is delayed by the delay time T1 due to the existence of the delay circuit 151, such that the charging time is gained for the capacitor C1 to accumulate sufficient amount of electric charges therein before the precharge switch signal Vgs reaches a turned-on point P1. Therefore, the charged capacitor C1 can prevent the system from being damaged due to the large instantaneous current generated when the system is restarted quickly.

Figure 6:
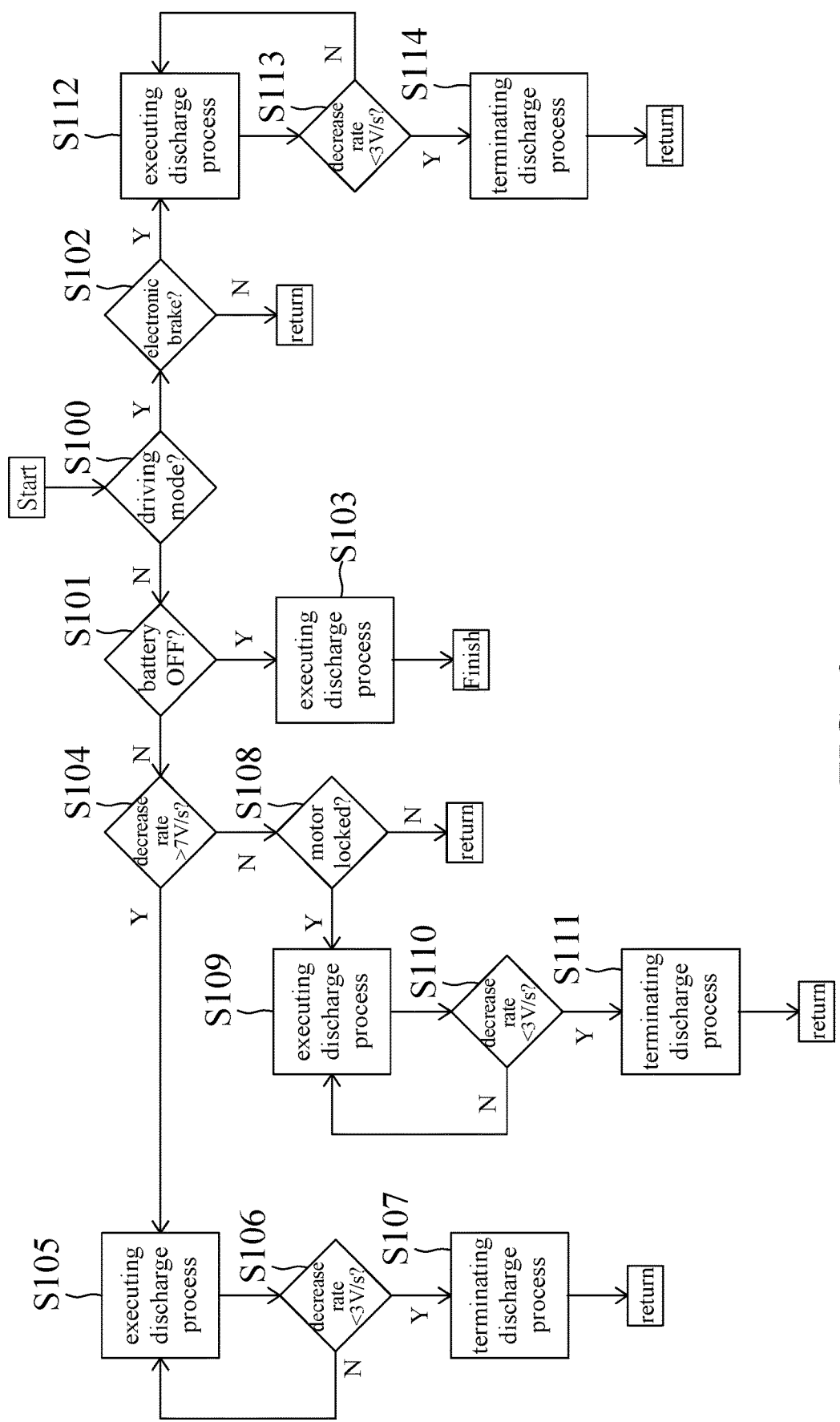
FIG. 6 is a flowchart of the detection circuit for executing a state detection process according to one embodiment of the present disclosure.

Reference is made to FIG. 6, which is a flowchart of the detection circuit for executing a state detection process according to one embodiment of the present disclosure. In detail, the detection circuit 150 can trigger the discharge process according to various states of the system. One example is provided below, but the present disclosure is not limited thereto. As shown in FIG. 6, the state detection process can include:

Step S100: detecting whether the motor drive system is in the non-driving mode or the driving mode.

In response to detecting that the motor drive system is in the non-driving mode, the state detection process proceeds to step S101: detecting whether or not the battery pack is turned off. In response to detecting that the motor drive system is in the driving mode, the state detection process proceeds to step S102: detecting whether or not an electronic brake command input from the user is received. For example, the detection circuit can receive the electronic braking command input by the user from the controller area network 14'.

In response to detecting that the battery pack is turned off in step S101, the state detection process proceeds to step S103: executing the discharge process. The state detection process is then ended.

In response to detecting that the battery pack is turned on in step S101, the state detection process proceeds to step S104: detecting whether or not the decrease rate of the first voltage is greater than 7 V/s.

In response to detecting that the decrease rate of the first voltage is greater than 7 V/s in step S104, the state detection process proceeds to step S105: executing the discharge process. Then the state detection process proceeds to step S106: detecting whether or not the decrease rate of the first voltage is less than 3 V/s, and if so, the state detection process proceeds to step S107: terminating the discharge process. Otherwise, step S105 is repeated. After step S107, the state detection process returns to step S100.

In response to detecting that the decrease rate of the first voltage is not greater than 7 V/s in step S104, the state detection process proceeds to step S108: detecting whether or not a motor lock command input from the user is received. For example, the detection circuit can receive the motor lock command input by the user from the controller area network 14'.

In response to receiving the motor locking command in step S108, the state detection process proceeds to step S109: executing the discharge process. Otherwise, the state detection process returns to step S100.

Afterwards, the state detection process proceeds from step S109 to step S110: detecting whether or not the decrease rate of the first voltage is less than 3 V/s, and if so, the state detection process proceeds to step S111 to terminate the discharge process, otherwise, step S109 is repeated. After step S111, the state detection process returns to step S100.

On the other hand, in response to receiving the electronic brake command in step S102, the state detection process proceeds to step S112 to execute the discharge process, or otherwise returns to step S100.

After step S112, the state detection process proceeds to step S113: detecting whether or not the decrease rate of the first voltage is less than 3 V/s, if so, the state detection process proceeds to step S114 to terminate the discharge process, or otherwise repeats step S112. After step S114, the state detection process returns to step S100.

In the state detection process, both of the electronic brake command or the motor lock command can be received through the controller area network 14', thereby executing the discharge process, so as to protect the system from high current impact, and realizing a variety of applications by utilizing the driving mechanism of the motor drive system.

Beneficial Effects of the Embodiments

In conclusion, the motor drive system provided by the present disclosure has a precharge circuit with an intelligent charging and discharging mechanism. In terms of charging, a delay circuit can be used to delay a timing for turning on the low-impedance path, such that the charged internal capacitor can prevent the system from being damaged due to the large instantaneous current generated when the system is restarted quickly.

On the other hand, the detection circuit of the precharge circuit can detect a system status and a battery voltage, and perform a discharge process in a non-driving mode and when the battery voltage continues to decrease, such that the voltage can be lower than the rated safe voltage and the precharge start-up voltage. In the discharge process, a variety of applications can be further realized using the driving mechanism of the motor drive system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor drive system for driving a motor, and the motor drive system comprising:
    a battery pack including a first battery unit and a second battery unit connected in series between a first input terminal and a second input terminal;
    a power control circuit configured to control the battery pack to be turned on and off;
    a capacitor connected between the first input terminal and the second input terminal;
    an inverter circuit connected to the first input terminal and the second input terminal to be powered by the battery pack, wherein the inverter circuit has a plurality of switch elements that are connected to form a plurality of output terminals, and the plurality of output terminals are connected to a plurality of phase windings of the motor, respectively;
    a motor control circuit configured to generate a set of motor control signals, so as to control the plurality of switch elements to be turned on and off, such that each of the phase windings of the motor is energized to drive the motor;
    a state detection circuit configured to detect an operating state of the motor drive system;
    a precharge circuit, including:
        a high-impedance path connected between the second input terminal and the battery pack;
        a low-impedance path connected between the second input terminal and the battery pack, wherein a resistance of the high-impedance path is greater than a resistance of the low-impedance path;
        a precharge switch disposed on the low-impedance path;
        a detection circuit configured to:
        compare a first voltage at the first input terminal with a precharge start-up voltage to correspondingly generate a detection result signal, wherein, in response to the first voltage being higher than the precharge start-up voltage, the detection result signal is used to control the precharge switch to be turned on, and in response to the first voltage being less than or equal to the precharge start-up voltage, the detection result signal is used to control the precharge switch to be turned off; and detect whether or not the operating state is a non-driving mode and whether or not the first voltage decreases with time, and in response to detecting that the operating state is the non-driving mode and the first voltage decreases with time, output a discharge indication signal for performing a discharge process on the capacitor, and stop outputting the discharge indication signal in response to detecting that the first voltage no longer decreases with time; and a delay circuit disposed between the detection circuit and the precharge switch, wherein the delay circuit is configured to delay the detection result signal for a predetermined delay time; and a discharge control circuit configured to execute the discharge process according to the discharge indication signal, including:

obtaining a current operating angle of the motor through the motor control circuit; and correcting, according to the current operation angle, the set of the motor control signals by a correction angle, so as to stop the motor and enter a discharge mode.

2. The motor drive system according to claim 1, wherein the power control circuit is further configured to generate a power state signal according to on and off states of the battery pack, and the detection circuit is further configured to:

in response to detecting that the operating state is the non-driving mode, determine whether the battery pack is turned on or off according to the power state signal; and in response to determining that the battery pack is turned off, output the discharge indication signal.

3. The motor drive system according to claim 2, wherein the detection circuit is further configured to:

in response to detecting that the battery pack is turned on, determine whether or not the first voltage decreases over time.

4. The motor drive system according to claim 3, wherein, when the detection circuit is configured to determine whether or not the first voltage decreases with time, the detection circuit is further configured to determine whether or not a decrease rate of the first voltage is greater than a first predetermined decrease rate, and if so, the first voltage is determined to decrease with time.

5. The motor drive system according to claim 3, wherein, when the detection circuit is configured to determine that the first voltage does not decrease with time, the detection circuit is further configured to determine whether or not a motor lock command input from a user is received, wherein, in response to receiving the motor lock command, the detection circuit is configured to output the discharge indication signal.

6. The motor drive system according to claim 3, wherein, when the detection circuit is configured to detect whether or not the first voltage decreases with time, the detection circuit is further configured to determine whether or not a decrease rate of the first voltage is less than a second predetermined decrease rate, and if so, the first voltage is determined to no longer decrease with time.

7. The motor drive system according to claim 1, wherein the motor control circuit is further configured to detect a plurality of phase currents of a plurality of the phase windings of the motor, so as to generate angle information for indicating the current operating angle of the motor.

8. The motor drive system according to claim 1, wherein, in response to detecting that the operating state is not the non-drive mode, the detection circuit is further configured to detect whether an electronic brake command input from a user is received, and if so, the detection circuit outputs the discharge indication signal.

9. The motor drive system according to claim 8, wherein, when the discharge indication signal is output in response to receiving the electronic brake command input from a user, the detection circuit is further configured to detect whether or not the first voltage decreases with time, and in response to detecting that the first voltage no longer decreases with time, the detection circuit stops outputting the discharge indication signal.

10. The motor drive system according to claim 1, wherein, when the precharge switch is turned off, the battery pack charges the capacitor with a precharge current through the high-impedance path, and the predetermined delay time is at least longer than a charging time associated with the precharge current and a capacitance of the capacitor.

* * * * *